United States Patent

[11] 3,611,287

[72] Inventors Marc Hoff
45 B Old Oak Lane, Levittown, N.Y. 11756;
Rodney J. Solomon, 400 Fulton St., Farmingdale, N.Y. 11735
[21] Appl. No. 31,592
[22] Filed Apr. 24, 1970
[45] Patented Oct. 5, 1971

[54] VEHICLE ANTITHEFT CONTROL AND SIGNAL DEVICE
10 Claims, 6 Drawing Figs.
[52] U.S. Cl.................................................... 340/63,
307/10, 200/45, 180/114
[51] Int. Cl........................................................ B60r 25/00
[50] Field of Search............................................ 340/63, 64,
65; 307/10; 200/42, 43, 44, 45; 180/114

[56] References Cited
UNITED STATES PATENTS
3,548,373 12/1970 Rivera et al..................... 340/63 X
3,525,414 8/1970 Copelan ......................... 340/63 UX
3,242,460 3/1966 Morrell ........................... 340/63 X Primary Examiner—Alvin H. Waring
Attorney—S. A. Giarratana ABSTRACT: An antitheft system for motor vehicles comprising an electromechanically actuated, normally locked hood latch and a normally open security switch in the ignition circuit in series with the conventional key-operated ignition switch. A cascade of semiconductor-controlled rectifiers (SCR) operate when triggered in series order after closing the key-switch to complete the ignition circuit and unlock the hood latch. A bank of momentary-contact switches at the driver station includes several which, operated in proper coded sequence, trigger the SCR's in series order and several others, operation of any one of which will prevent completion of the ignition circuit and unlocking of the hood latch until the key-switch is turned off momentarily. A selectively operable switch accessible to the driver permits him to override the ignition security circuit when turning off the engine so as to permit restarting without use of the coded sequence switches while maintaining the hood latched in locked condition and giving an audible signal that the ignition is not in security condition. The audible signal can be terminated only by use of the coded sequence and automatically restoring the ignition to its security condition. Placing the key-switch in the ACCESSORY position permits the hood latch to be unlocked by use of the coded sequence switches without energizing the ignition circuit.

PATENTED OCT 5 1971 3,611,287

INVENTOR.
MARC HOFF
BY RODNEY J. SOLOMON

INVENTOR.
MARC HOFF
BY RODNEY J. SOLOMON

VEHICLE ANTITHEFT CONTROL AND SIGNAL DEVICE

This invention relates to a security system for motorized vehicles and more particularly to a tamperproof, electronically controlled ignition and hood-locking arrangement for automobiles and other vehicles having inboard engines.

The high and rapidly increasing incidence of automobile theft and "joy riding" (unauthorized use) has become a cause for national concern and has provoked any number of countermeasures including ignition locks which operate to lock the steering wheel; advertising campaigns designed to induce the motorist to lock both the ignition and the doors when leaving his vehicle; and in some states, the enactment of legislation imposing fines and other sanctions on drivers leaving their keys in the ignition lock.

A wide variety of devices and systems has been proposed for protecting motor vehicles against theft and unauthorized use; but none, insofar as is known, has achieved any significant degree of commercial acceptance. Presumably, this has been due to the many defects and shortcomings of the equipment heretofore proposed which has been unreliable, cumbersome expensive, and/or difficult to install.

The object generally of the subject invention is to overcome the disadvantages of prior art motor vehicle security devices and particularly to provide a practical, foolproof and tamperproof arrangement for locking the ignition system out of service while preventing the hood from being opened to circumvent the ignition-locking system and/or strip engine components or accessories.

Another object is the provision of a novel security system which automatically becomes operative upon turning off the engine ignition with the conventional key switch while allowing selective override to permit the hood to be opened for service while the ignition remains locked or to permit the ignition to function while the hood remains locked.

A further object is the provision of an improved motor vehicle security system which drains no current when locked, negligible current when actuated, and requires no keys, punch cards or other coded devices for operation.

Still another object is the provision of a novel security system employing solid-state electronics and a pushbutton sequence code which defies deciphering and has intrinsic safeguards against tampering and circumvention

BRIEF DESCRIPTION OF THE INVENTION

The invention contemplates a normally open, relay-operated security switch in series with the conventional key switch almost universally used in motor vehicle ignition systems. In addition, a solenoid-operated, normally locked hood latch is provided within the engine compartment. A cascade of semiconductor-controlled rectifiers (SCR's), each having a momentary contact pushbutton switch associated with its gate terminal, can be triggered to conduction only in series order by actuating the pushbuttons in a preset sequence. Conduction of all SCR's drives the relay to close the security switch and energize the solenoid, thus enabling the ignition system and unlocking the hood latch. An additional SCR which can be triggered to conduction by any one of a number of additional momentary contact switches connected in parallel to its gate terminal and, while conductive, precludes excitation of the relay winding. The pushbutton actuators for the additional SCR are intermingled with and indistinguishable from these associated with the cascade of SCR's, thus thwarting attempts to decipher the sequence code by trial and error manipulation of the buttons. A manually operated, mechanical latching relay closes a bypass switch to complete the ignition circuit while the security switch remains open. A buzzer, activated by contacts on the manually operated relay, sounds all the while the bypass switch is closed and the key-operated ignition switch is turned on.

IN THE DRAWINGS

Figure 1:
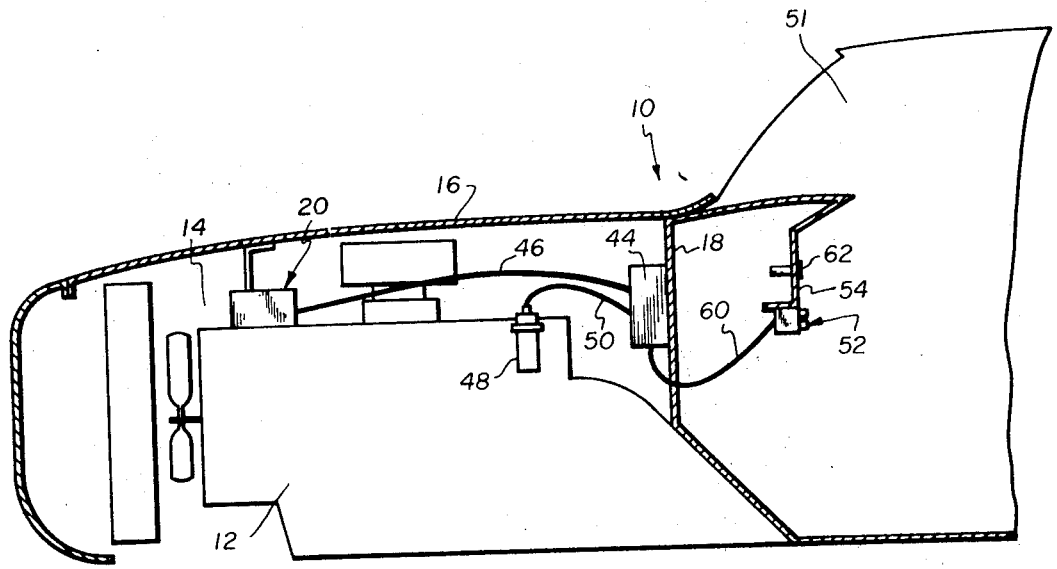
FIG. 1 is a partial longitudinal section through the engine compartment and the forward part (driver's station) of the passenger compartment of a motor vehicle embodying a security system according to the invention.

Referring first to FIG. 1, there is shown a forward portion 10 typical of a modern motor vehicle propelled by a multicylinder, spark-ignition, internal combustion engine 12 installed in the engine compartment 14. Access to the engine compartment is by means of a closure hood 16 which, in the illustrated embodiment, is hinged in the general vicinity of firewall 18 for pivotal movement about an axis extending transversely of the vehicle. Thus the hood, as shown in closed position, is opened by raising the forwardmost portion causing it to pivot about its hinges, not shown.

Figure 2:
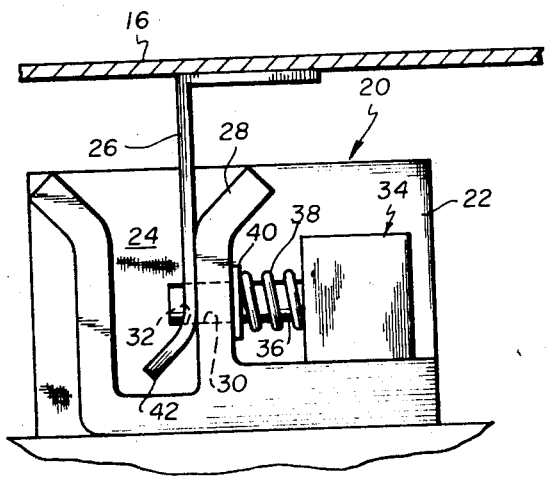
FIG. 2 is an enlargement of a portion of FIG. 1 showing details of construction of the engine compartment hood latch.

Mounted on any suitable fixed structure within the engine compartment is a solenoid-operated hood latch mechanism 20. In the illustrated embodiment, latch mechanism 20 is shown mounted atop the engine block 12 and, as shown in FIG. 2, consists of a body structure 22 defining an upwardly open cavity 24 adapted to receive a striker plate 26 secured to and projecting downwardly from the underside of hood 16.

Figure 3:
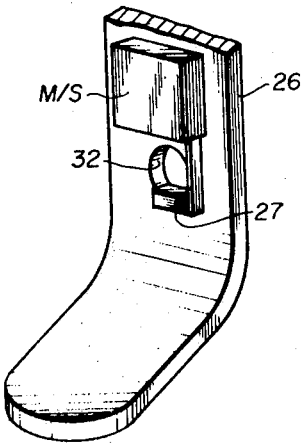
FIG. 3 is an enlargement of a portion of FIG. 2 showing further details of the hood latch.

One sidewall 28 of cavity 24 contains an aperture 30 in coaxial alignment with a similar aperture 32 in striker plate 26 when hood 16 is closed. A solenoid 34 is mounted on body structure 22 with its plunger 36 coaxially aligned with apertures 30 and 32. A compression spring 38, acting between the housing of solenoid 34 and a collar 40 secured to plunger 36, normally resiliently biases the plunger forwardly through aperture 30 into cavity 24. Abutment of collar 40 with the outer surface of cavity wall 28 limits the travel of the plunger into cavity 24 to an amount sufficient to project through the striker plate aperture 32 when the hood is closed while permitting the extreme forward end of the plunger to be engaged by a cam surface 42 on the lower end of the striker plate to momentarily displace the plunger from the cavity as the striker enters the cavity during closing movement of the hood. Excitation of solenoid 34 in a manner hereinafter described retracts plunger 36 against the bias of spring 38 to unlock the hood latch. If desired, striker 26 may be provided with a microswitch M/S as shown in FIG. 3. The microswitch actuator 27 is disposed so as to extend across a small segment of the lower edge of aperture 32. Connected in a manner hereinafter described, microswitch M/S functions to sound the vehicle's horn or energize a specially provided alarm siren if an attempt is made to force open hood 16.

Reverting to FIG. 1, there is mounted within engine compartment 14, at any suitable location such as on firewall 18, a solid-state electronic switching assembly, hereinafter described, contained within an appropriate housing and designated in its entirety as 44. As will presently appear, electronic switching assembly 44 controls excitation of the hood latch solenoid to which it is electrically connected by means of conductor 46, and selectively operates to disable and enable the ignition system represented in FIG. 1 by ignition coil 48 electrically connected to the electronic switching assembly by means of a conductor 50.

Figure 4:
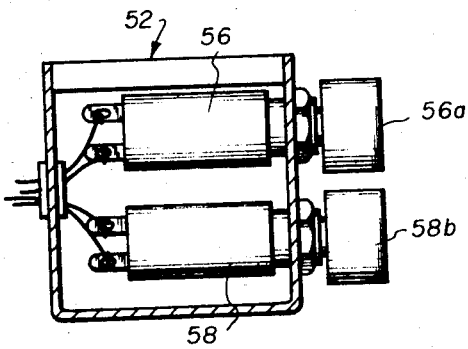
FIG. 4 is a sectional view of a push button control unit which constitutes one principal subassembly of the security system shown in FIG. 1.

Within the passenger compartment 51, at a position conveniently accessible to the driver, is a pushbutton control unit 52 shown mounted below the instrument panel 54. It will be appreciated that, if the security system were a factory-installed option, control unit 52 would be integrated with the instrument panel. Control unit 52 contains a plurality of momentary contact switches, two of which, 56 and 58 are shown in FIG. 4. At this juncture it should be noted that the electrical aspects and functions of the momentary contact switches will be described in conjunction with the overall system schematic of FIG. 5, wherein the switches 56 and 58 are identified by separate reference numerals.

Each momentary contact switch in control unit 52 is actuated by a respective one of an array of pushbuttons, such as 56a and 58a, projecting from the face of the unit.

Control unit 52 is electrically connected to switch assembly 44 by means of a cable 60 passing through firewall 18. Cable 60 contains a number of individual conductors, including one for each momentary contact switch, as will be described presently.

Also shown on instrument panel 54 is a conventional key-operated ignition switch 62 of the type in almost universal use in present day motor vehicles. This switch has three stable positions: (1) OFF; (2) IGNITION ON, angularly displaced in one direction (usually clockwise) from the OFF position and energizing the ignition and all other circuits; and (3) ACCESSORY ON, angularly displaced from OFF in a direction (usually counterclockwise) opposite to that of IGNITION ON. The ACCESSORY ON position energizes all of the same circuits as IGNITION ON except the ignition circuit. The starting motor (not shown) is energized by momentarily turning the key-switch past the IGNITION ON position against the restoring force of a return spring which moves the switch back to IGNITION ON when released. While the key-switch is in the START position, all other circuits except the ignition are interrupted.

Before continuing with a description of the circuitry contemplated by the invention, it is pointed out that the security system will be disclosed in connection with a battery-energized, negative-ground, 12-volt electrical system. While all domestic motor vehicles of modern design utilize a negative-ground system, and this will be the basis of the circuit description for sake of literary ease, it will be understood that the system can be adapted in obvious manner to a positive-ground system or to the protection of other electrical/electromechanical systems.

Figures 5, 6:
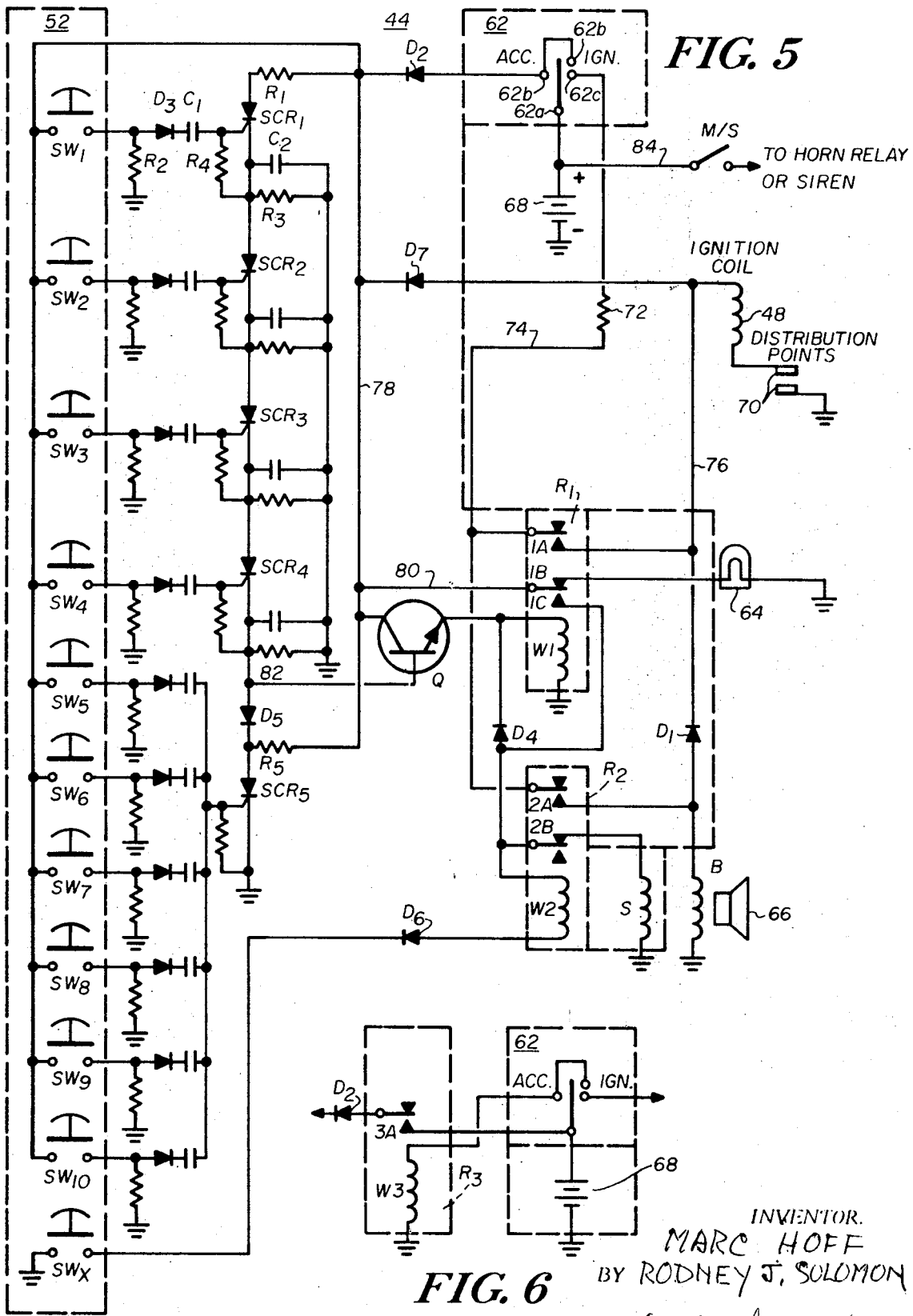
FIG. 5 is a schematic wiring diagram of the operating circuitry contemplated by the invention and so much of a typical motor vehicle ignition system as is relevant and necessary to an understanding of the invention.
FIG. 6 is a portion of the wiring diagram of FIG. 5 involving the existing key lock ignition switch modified to illustrate a variant form of the invention.

Referring to FIG. 5, wherein the entire security system is depicted in schematic form, portions of the schematic are enclosed in broken lines to correlate with the mechanical aspects of various components already described. Thus, the electrical details of pushbutton console 52 are enclosed in a dash line area designated 52. Similarly designated in FIG. 5 is area 44 corresponding to the switching assembly and area 62 enclosing the electrical analog of the key-operated ignition switch.

FIG. 5 also includes a signal lamp 64 and a buzzer 66 not previously mentioned. The signal light is mounted either in the housing of pushbutton console 52 or on instrument panel 54. Buzzer 66 may be mounted in any location which would make it audible to the driver, e.g., under the instrument panel. The functions of the signal light and buzzer will become apparent as this description proceeds.

FIG. 5 includes a representation of so much of the ignition system of the motor vehicle as is germane to the invention, viz., battery 68 which serves as a source of DC potential, the induction or ignition coil 48 and the make-and-brake distributor points 70.

Battery 68, conventionally, has its negative terminal connected to a suitable system ground and positive terminal electrically connected to the movable contact 62a of ignition switch 62 having ACCESSORY ON AND IGNITION ON contacts, 62b and 62c, respectively, already alluded to. It should be noted that contact 62b is duplicated in the schematic to show that all accessory circuits are energized in addition to the ignition circuit when the switch is turned to IGNITION ON position. As will become apparent as this description proceeds, a diode $D_7$ connecting conductor 76 to conductor 78 maintains the lock circuit while all others, except ignition, are interrupted while the key switch is moved to the START position to start the engine.

The ignition circuit from the power source is through contact 62c, a dropping resistor 72 in conductor 74, normally open contacts 1A of relay $R_1$, conductor 76, and coil 48 to ignition points 70. In parallel with relay contacts $R_{1A}$ in the ignition circuit are normally open contacts 2A of relay $R_2$, so that the ignition circuit can be completed between conductors 74 and 76 by way of relay contacts $R_{2A}$ and through diode $D_1$.

With the ignition switch in either of its ON positions, battery power is supplied to signal lamp 64 via contact 62b, diode $D_2$, conductors 78 and 80, and normally closed contacts 1B of relay $R_1$. Thus, when the ignition switch is turned to IGNITION ON, the ignition circuit is not complete, being interrupted by open relay contacts $R_{1A}$, and signal light 64 goes on to indicate the fact that the ignition circuit is in secured condition.

The operation of relays $R_1$ and $R_2$ is subject to the control of switching assembly 44 and pushbutton unit 52 be means of circuitry now to be described.

Switching assembly 44 contains a plurality of trigger-operated, bistable semiconductor junction devices such as semiconductor-controlled rectifiers (SCR's). Any reasonable number may be employed and the basis for selecting the number will be explained in due course. In the illustrated embodiment there are five SCR's, designated $SCR_1$, $SCR_2$, ... $SCR_5$. Of the five, four are connected in series with like polarity, that is, cathode-to-anode. Contact 62b of the ignition switch is connected through diode $D_2$ and a current-limiting resistor $R_1$ to the anode of $SCR_1$ so that a positive bias potential is applied when the ignition switch is turned on.

As is well known in the art, SCR's have operating characteristics analogous to a thyratron (and hence are sometimes called "thyristors"). In addition to the anode and cathode, SCR's have a control electrode hereinafter referred to as a "gate." In operation, an SCR remains nonconductive even though forwardly biased by a positive anode potential if below a prescribed limit for the particular device. When a positive trigger potential is applied to the gate, the device becomes conductive and normally "latches" in the conductive condition until turned off, as by dropping the anode potential or raising the cathode potential. Like a thyratron, which is not turned off with its grid, an SCR is not usually turned off with its gate.

By reference to the schematic, it will be seen that until $SCR_1$ is triggered, no bias potential reaches $SCR_2$, and so forth along the series so that the SCR's can be triggered only in series order.

The trigger circuit of $SCR_1$ runs from the power source through a normally open momentary contact switch $SW_1$ in series with a diode $D_3$ and capacitor $C_1$. Switch $SW_1$ is contained in the control unit 52 and is actuated by one of the array of pushbuttons thereon. The trigger circuit of $SCR_1$ is connected to ground through resistor $R_2$ at a point between switch $SW_1$ and diode $D_3$. Diode $D_3$ prevents AC impedance measurements as a means of deciphering the code sequence and also prevents spurious signal pickup. Capacitor $C_1$ prevents DC impedance measurements and prevents rapid retriggering to prevent defeating the security system by random pressing of the pushbutton.

A resistor $R_3$ and capacitor $C_2$ are connected in parallel from a point between $SCR_1$ and $SCR_2$ and ground, and the gate electrode of $SCR_1$ is connected through resistor $R_4$ to a point between $SCR_1$ and $SCR_2$. When $SW_1$ is closed, the trigger potential is supplied to the gate of $SCR_1$ causing current to flow through the $R_1$, $SCR_1$ and $R_3$, charging capacitor $C_1$ and then $C_2$. Thus the positive bias potential is transferred to the anode of $SCR_2$ as $SCR_1$ latches in its conductive state by reason of current flow through $R_1$ and $R_3$. Capacitor $C_2$ prevents all succeeding SCR's from being triggered along with the $SCR_1$.

$SCR_2$, $SCR_3$, and $SCR_4$ have identical trigger circuits, each containing a respective pushbutton actuated switch $SW_2$, $SW_3$, and $SW_4$, and the same bias and coupling networks. As the correspondence between components is obvious and the functions identical, the description will not be repeated for each stage of the cascade.

The cathode of the final SCR of the cascade is directly connected by a conductor 82 to the base terminal of a power transistor Q. The collector terminal of transistor Q is connected to the power source by way of conductor 78 while the emitter is connected to one terminal of the winding $W_1$ of relay $R_1$, the other terminal of which is connected to ground.

Thus, it will be seen that, in the absence of a potential supply to the base of Q, the emitter-collector circuit is cut off. When all of the SCR's, 1 through 4, have been triggered, the bias potential is transferred to the base of $Q_1$ causing saturation, thus driving relay $R_1$. This closes normally open contacts $R_{1A}$ completing the ignition circuit; opens normally closed contacts $R_{1B}$ to extinguish signal light 64 and thus show that the ignition circuit is enabled; and close normally open contacts $R_{1C}$, which latches the relay through diode $D_4$ while at the same time energizing the hood latch solenoid S through normally closed contacts 2B of relay $R_2$. Diode $D_4$ limits the driving current through transistor Q to that drawn by winding $W_1$; if a transistor of sufficient power-handling capacity to drive both $W_1$ and solenoid $S_1$ is used for $Q_1$, $D_4$ can be omitted.

Energizing the solenoid retracts the plunger 36 FIG. 2) unlocking the hood. The latching action of relay $R_1$ resets the SCR cascade, returns it to the OFF condition; thus the electronic components are in service only while the pushbutton sequence is being performed.

From the circuitry thus far described, it will seem that triggering of $SCR_1$, $SCR_2$, $SCR_3$, and $SCR_4$ in series order enables the ignition system and unlocks the hood. The SCR's 1 through 4 are triggered by respective pushbuttons on control unit 52 which actuate switches $SW_1$ through $SW_4$ but are not arranged in a particular or obvious order in the pushbutton array. Nevertheless, with four cr's, there are only 24 possible sequence combinations to thwart the would-be thief. The addition of one more SCR in the series and therefore one more button on the control unit increases the number of combinations to 120; however, in accordance with the present invention, the number of combinations are not only multiplied many times with only slightly more circuitry than would be involved in adding one additional SCR to the series $SCR_1$ through $SCR_4$ but provides a relatively large number of "decoy" buttons, any one of which renders it impossible to unlock the system unless the key ignition switch is turned off momentarily to reset the trigger circuits.

To this end, $SCR_5$ has its anode connected in series with a current-limiting resistor $R_5$ to the power source by way of conductor 78 and its cathode connected to ground. The anode of $SCR_5$ is also connected via diode $D_5$ to the base of transistor Q.

The trigger circuit of $SCR_5$ is made up of any reasonable number of parallel branches (six are shown for example), each one of which is made up of a respective momentary contact switch, $SW_5$ through $SW_{10}$, and is in all other respects identical both in configuration and circuit values as the trigger circuits of $SCR_1$ through $SCR_4$. Consequently, the triggers exhibit the same impedance among themselves, and with respect to ground, thus foiling any attempt to distinguish the authentic from the decoy triggers by cutting the input wires from the switches.

The pushbuttons associated with switches $SW_5$ through $SW_{10}$ are included in the array on control unit 52, bringing the total number to 10 in the illustrated embodiment. The effect of pushing a decoy button is to trigger $SCR_5$, which latches in conductive state and clamps the base of transistor Q to ground through diode $D_5$, thus preventing saturation even if $SCR_1$ through $SCR_4$ are all conducting.

Relay $R_2$ is a mechanical latching relay. Its winding $W_2$ connects to the power source by way of conductors 78 and 80 and contact $R_{1C}$. The circuit is completed to ground through diode $D_6$ and momentary contact switch $SW_X$ which is actuated by a pushbutton on the control unit, although perhaps spaced from, or otherwise distinguished from, the remaining buttons.

As relay $R_2$ connects to the power source through normally open contact 1C of relay $R_1$, switch $SW_X$ is ineffective unless the engine is running or at least appropriate pushbuttons to condition the ignition for starting have been pushed to drive and latch relay $R_1$ and close $R_{1C}$. Thereafter, closing switch $SW_X$ drives relay $R_2$ closing contact 2A, which completes an ignition circuit in parallel with that through contact $R_{1A}$. As $R_2$ is mechanically latched, the ignition circuit through contact $R_{2A}$ is maintained when the ignition switch is turned off dropping out relay $R_1$. While the system is in this condition, i.e., while relay $R_2$ is latched, the engine can be started in the conventional fashion with the key switch. However, as normally closed contact $R_{2B}$ is latched, hood latch solenoid S is deenergized so that the hood remains locked. Diode $D_6$ prevents defeat of the system by application of a reverse bias signal at switch $SW_x$ to drive relay $R_2$, i.e., a positive potential would be required at $SW_x$ because the ground is negative and a positive potential is blocked be diode $D_6$. This feature permits the vehicle to be left with parking lot attendants without disclosing the pushbutton combination.

While $R_2$ remains latched, and contact $R_{2A}$ closed, a circuit is completed from ignition switch contact 62c through conductor 74 to signal buzzer B. Consequently, whenever the ignition switch is turned to IGNITION ON, buzzer B gives the driver an audible reminder that the ignition system is unprotected. To reactivate the security system, the proper combination of pushbuttons is pressed and the switch $SW_X$ closed to reset $R_2$, turning off the buzzer.

The security system permits the hood latch to be unlocked for service without energizing the ignition circuit. For this purpose, the key-switch is turned to the ACCESSORY ON position and then the buttons on the control unit are pressed in the same sequence as for starting the car. Whether the IGNITION OF or ACCESSORY ON is used, turning the key to OFF position removes the driving current from the relays causing them to drop out resetting the system.

As shown in FIG. 5, the microswitch M/S on the hood latch striker 26 has one contact connected via conductor 84 to the positive terminal of battery 68 and the other contact connected to the winding of the horn relay (not shown) or a siren (also not shown). Thus, if an attempt is made to raise the hood without the hood latch solenoid S having been energized, as described above, to retract plunger 36 (FIG. 2), the microswitch is closed sounding the vehicle's horn or setting off a burglar alarm siren.

Referring to FIG. 6, there is illustrated a variation in a portion of the system circuit of FIG. 5, particularly the portion associated with ignition switch 62. The variation consists of the provision of an additional relay $R_3$ having its winding $W_3$ connected between the ACCESSORY ON contact 62a of the ignition switch and ground. Relay $R_3$ has a single normally open contact 3A connected between the anode of diode $D_2$ and the positive battery terminal. Relay $R_3$ is employed only in installations where access to the ignition switch must be had in the passenger compartment. In such installations, $R_3$ prevents detection of the code combination by measuring the current drain of the electronics from the battery into diode $D_2$.

Other variations of the specific arrangement of the system disclosed above can be made by those skilled in the art without departing from the invention as defined in the appended claims.

What is claimed is:

1. An antitheft system for motor vehicles having an ignition circuit energized from one pole of a DC power source, the other pole of which represents ground potential, comprising:

a relay having a first set of normally open contacts interposed in said ignition circuit and a second set of normally open contacts interposed in series with the relay winding between said power source and ground potential, whereby excitation of the winding and concomitant closure of said first and second sets of contacts respectively enables the ignition circuit and latches the relay; and code circuit means operable to excite said relay winding comprising:

a plurality of bistable semiconductor junction devices having anode, cathode, and gate terminals, said devices being connected in series cathode-to-anode;

means for applying to the anode of the first of the series of semiconductor devices a bias potential from the positive terminal of said DC source;

respective trigger circuits connected to said gate terminals;

respective normally open momentary contact switches in said trigger circuits selectively operable to apply a triggering potential from said DC source to the associated gate terminal;

impedance means associated with each said semiconductor device to achieve latching thereof in conductive condition when triggered and preclude triggering of the second and succeeding devices until triggered subsequent to triggering of the immediately preceding device, whereby triggering of all said devices can be effected only by actuation of said momentary contact switches in a preset sequence corresponding to the series order of devices beginning with the first; and solid-state switching means in circuit with said relay winding and operative in response to conduction by the last of said series of semiconductor devices to excite said winding from said DC power source.

2. An antitheft system according to claim 1, wherein said solid-state switching means is a transistor having emitter and collector terminals connected in series with said relay winding and having a base electrode connected to the last of said series of semiconductor controlled rectifier devices.

3. An antitheft system according to claim 2, where said bistable semiconductor junction devices are controlled rectifiers.

4. An antitheft system according to claim 3, including an additional semiconductor controlled rectifier device having its anode and cathode terminals connected between the base of said transistor and ground potential whereby conduction between said anode and cathode maintains said transistor base electrode at ground potential, thus preventing conduction through its emitter-collector circuit and concomitantly precluding excitation of said relay winding; and means for applying a trigger potential to the gate electrode of said additional semiconductor controlled rectifier comprising:

a number of identical parallel trigger circuits connected in common at one end to the gate terminal of said additional SCR device; and, additional momentary contact switches, one for each parallel trigger circuit, and in series therewith between the other end of such circuit and a source of trigger potential, the first-mentioned and additional momentary contact switches having identical operating buttons indistinguishably clustered and accessible in the passenger compartment.

5. An antitheft system according to claim 4, wherein all of said trigger circuits are normally identical and consist of a diode polarized for low impedance to current from said trigger potential source to the associated gate terminal, a capacitor in series with the diode between the diode and gate terminal, and a resistive impedance means connecting a point between the diode and momentary contact switch to ground potential.

6. An antitheft system according to claim 1, further comprising a solenoid-operated hood-latching mechanism resiliently biased to locked condition in the absence of excitation of the solenoid; and circuit means connecting one end of the solenoid to ground potential and the other end to said DC power source through said second set of normally open contacts of the relay.

7. An antitheft system according to claim 5 further comprising a winding, a set of normally closed contacts in series with said solenoid, and a set of normally open contacts connected in parallel with the first set of normally open contacts of the first relay, the switch in series with the second relay winding between one end thereof and ground potential, the other end of the second relay winding being connected to said DC source through said second set of normally open contacts of the first relay.

8. An antitheft system according to claim 6, further comprising a set of normally closed contacts on said first relay and a signal lamp connected between ground potential and said DC source through said normally closed contacts on the first relay.

9. An antitheft system according to claim 7 further comprising an electrically operated audible signal generator connected to be energized through the normally open contacts of the second relay.

10. An antitheft system according to claim 8, wherein said ignition circuit includes a key-operated switch having an ACCESSORY ON position and an IGNITION ON position, the contacts of the ACCESSORY ON position of the switch being in series with the bias potential supply to said first SCR anode and closed in the ACCESSORY ON position, the IGNITION ON position having contacts in series with the first said set of normally open contacts of said first relay, said IGNITION ON contacts being open when the switch is in the ACCESSORY ON position.